United States Patent

Turina

(10) Patent No.: US 9,462,443 B2
(45) Date of Patent: Oct. 4, 2016

(54) METHOD OF HANDLING RADIO ACCESS AND TO PRIORITIZE SUBSCRIBERS IN CASE OF AN EMERGENCY

(75) Inventor: Dalibor Turina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1174 days.

(21) Appl. No.: 12/595,740

(22) PCT Filed: Apr. 17, 2007

(86) PCT No.: PCT/SE2007/050249
§ 371 (c)(1),
(2), (4) Date: Oct. 13, 2009

(87) PCT Pub. No.: WO2008/127163
PCT Pub. Date: Oct. 23, 2008

(65) Prior Publication Data
US 2010/0112976 A1    May 6, 2010

(51) Int. Cl.
*H04W 4/22*    (2009.01)
*H04W 76/00*    (2009.01)
(Continued)

(52) U.S. Cl.
CPC .............. *H04W 4/22* (2013.01); *H04W 76/007* (2013.01); *H04W 48/12* (2013.01); *H04W 74/0875* (2013.01)

(58) Field of Classification Search
CPC ........... H04W 36/0005; H04W 36/04; H04W 36/12; H04W 36/14; H04W 36/16; H04W 36/34; H04W 4/02; H04W 24/08; H04W 36/0022; H04W 68/00; H04W 68/04; H04W 56/001; H04W 4/22; H04W 76/007; H04W 74/0875; H04W 48/12; H04W 84/08; H04W 28/26
USPC ............... 455/435.2, 435.3, 404.1, 443, 444, 455/435.1, 436, 518, 552.1
See application file for complete search history.

(56) References Cited

U.S. PATENT DOCUMENTS

| | | | |
|---|---|---|---|
| 6,292,670 B1 * | 9/2001 | Kauria et al. | 455/518 |
| 6,456,858 B1 * | 9/2002 | Streter | 455/552.1 |
| 6,925,302 B2 | 8/2005 | Kojima et al. | |

(Continued)

FOREIGN PATENT DOCUMENTS

| | | |
|---|---|---|
| EP | 1 052 866 | 11/2000 |
| WO | WO 97/16931 | 5/1997 |
| WO | WO 02/17671 A1 | 2/2002 |

OTHER PUBLICATIONS

Chinese Office Action issued in Application No. 207780052626.5 dated Oct. 10, 2012 with English Translation.

(Continued)

*Primary Examiner* — George Eng
*Assistant Examiner* — Hung Du

(57) ABSTRACT

In a multi-access environment, applications with high priority can temporarily, when needed, occupy parts or even complete resources from at least one of the accesses in a certain geographical area radio access can be secured for such applications. An area consisting of a number of cells is created In such an area, an application having high priority can have guaranteed resources on one pre-determined access while other "ordinary" traffic is temporarily directed to the other access(es) even if that may result in a lower Quality of Service (QoS) in that particular area.

20 Claims, 3 Drawing Sheets

(51) Int. Cl.
*H04W 48/12* (2009.01)
*H04W 74/08* (2009.01)

(56) References Cited

U.S. PATENT DOCUMENTS

| | | |
|---|---|---|
| 2002/0065063 A1 | 5/2002 | Uhlik et al. |
| 2003/0220108 A1* | 11/2003 | Kojima et al. ............. 455/435.3 |
| 2004/0090935 A1* | 5/2004 | Courtney ...................... 370/331 |
| 2005/0090224 A1 | 4/2005 | Dorsey et al. |
| 2005/0282554 A1 | 12/2005 | Shyy |
| 2006/0094396 A1 | 5/2006 | Raghuram et al. |
| 2006/0094397 A1 | 5/2006 | Raghuram et al. |
| 2006/0274705 A1* | 12/2006 | Tugcu et al. ................. 370/338 |
| 2007/0280264 A1* | 12/2007 | Milton et al. ............ 370/395.31 |
| 2008/0032713 A1* | 2/2008 | Yang ............................. 455/458 |
| 2008/0102784 A1* | 5/2008 | Mittal et al. ............... 455/404.1 |
| 2009/0233600 A1* | 9/2009 | Johansson et al. ........ 455/435.2 |

OTHER PUBLICATIONS

Chinese Office Action and English translation thereof mailed May 3, 2012 in Chinese Patent Application 200780052626.5.
International Search Report for PCT/SE2007/050249, mailed Feb. 13, 2008.
Philippine Subsequent Substantive Examination Report mailed Jun. 26, 2013 in Philippine application 1/2009/501712.
Canadian Office Action mailed Jan. 29, 2014 in Canadian Application 2,683,918.

* cited by examiner

METHOD OF HANDLING RADIO ACCESS AND TO PRIORITIZE SUBSCRIBERS IN CASE OF AN EMERGENCY

This application is the U.S. national phase of international Application No. PCT/SE2007/050249 filed 17 Apr. 2007, which designated the U.S., the entire contents of which is hereby incorporated by reference.

TECHNICAL FIELD

The present invention relates to a method, a system and a device for handling radio access to prioritized subscribers e.g. in case of an emergency.

BACKGROUND

Today, new radio access technologies are being specified and subsequently implemented by operators of cellular telecommunications systems. Consequently it has become more and more common that one operator of a radio systems network has several radio access technologies being deployed concurrently in the same geographical area.

At the same time, mobile terminals are becoming more and more sophisticated often comprising capabilities for communicating over more than one type of radio access. Such evolution will impose a requirement to be able to use multi-access capabilities in an optimal way so that operator can make best usage of the deployed radio technologies. One of the most decisive parameters for optimizing the usage is the currently used capacity in different radio access technologies (RATs).

Examples of deployed technologies include GSM with sub-standards such as the General Packet Radio Services (GPRS) and the Enhanced Data rates for GSM Evolution (EDGE). There is also WCDMA, with the sub-standard High-Speed Downlink Packet Access (HSDPA) has been introduced. Other standards are CDMA and Long Term Evolution (LTE).

As stated above, a multitude of standards may exist overlapping within an area served by an operator and the operator of such a combined network of different standards is faced with the problem of having to manage the resources within the combined network in a way that both maximizes the use of the combined resources and maximizes the service provided to each mobile user within the combined network.

Traditionally, wireless communication systems for special usage like police, fire brigade and civil defense are deployed as dedicated systems (e.g. TETRA technology). Such solutions are expensive for the country administration. Therefore, more and more requirements are put onto commercial systems to be able to adequately accommodate high priority traffic when needed.

In a single access environment it means that "ordinary" traffic is down prioritized at service request. The same approach can be applied in a multi-access environment but there is still a risk of having congestion situation on the random access channel of the respective RAT.

Alternatively, some "ordinary" mobile stations can be refused to make location update in a location area belonging to a certain access or even refused a service upon invocation so that it can be exclusively used for priority traffic. However, both those methods are slow and with worse performance.

Hence, there exists a need for a method and a system that is able to guarantee radio access to prioritized subscribers in case of an emergency, which is inexpensive to implement, which is reliable and which provides high performance.

SUMMARY

It is an object of the present invention to overcome or at least reduce some of the problems associated with radio access in case of a need to give priority so that radio traffic essential to e.g. handling an emergency situation can be guaranteed access to radio resources.

This object and others are obtained by the method and system as set out in the appended claims. Thus, by utilizing a multi-access environment so that applications with high priority can temporarily, when needed, occupy parts or even complete resources from at least one of the accesses in a certain geographical area radio access can be secured for such applications.

According to this invention, an area consisting of a number of cells is created In such an area, an application having high priority can have guaranteed resources on one pre-determined access while other "ordinary" traffic is temporarily directed to the other access(es) even if that may result in a lower Quality of Service (QoS) in that particular area. A number of different mechanisms may be employed to secure the traffic steering capabilities of the system as described herein. Further, by defining areas for handling priority traffic as geographically limited, the rest of the network remains untouched so that the traffic is served in a usual manner.

In accordance with one embodiment broadcasted radio parameters are used in the cell-reselection algorithms. To differentiate the parameter values for different user groups a set of values that steer "ordinary" mobile stations to one access while defining other values for steering "high priority" mobile stations to one other access may be employed.

In accordance with another embodiment broadcasted or individually signaled parameters can explicitly steer different users/groups to different accesses.

Regardless of what mechanism is used to steer mobile stations not requiring the high priority radio access away from that access, that mechanism is preferably standardized such that all ordinary mobile stations are effectively removed from the radio access allocated for the high priority/emergency use.

Furthermore, the temporary re-direction of the traffic can be triggered by the operator upon request from police/fire brigade etc. or even directly by an authorized mobile station user in the field.

In addition to limit the impact on ordinary mobile traffic and at the same time secure a large enough area a number of different approaches may be employed. For example, the shaping of the geographical area that needs such priority handling can be done by an operator designating a geographical area as emergency area. The shaping of the geographical area may also be done automatically. For example, first a single cell where the need has occurred is designated as a high priority/emergency area. Also, initially surrounding cells are designated as a part of the area. If there are no high priority calls from surrounding cells for some predetermined time, they can be re-allocated back to "ordinary" traffic. However, if a high priority call is placed from one of the surrounding cells, the area can be increased to comprise that cell and that cell and all its surrounding cells, at least for some pre-determined time period.

Using the method and the system as described herein, Multi-access environment controlled by one operator can efficiently be used in situations giving high priority to some users by providing guaranteed service on one pre-defined access while still offering "ordinary" commercial service on the other access(es). Such temporary re-direction of the traffic can be applied in a geographical area shaped according to needs.

BRIEF DESCRIPTION OF THE DRAWINGS

The present invention will now be described in more detail by way of non-limiting examples and with reference to the accompanying drawings, in which.

DETAILED DESCRIPTION

Figure 1:
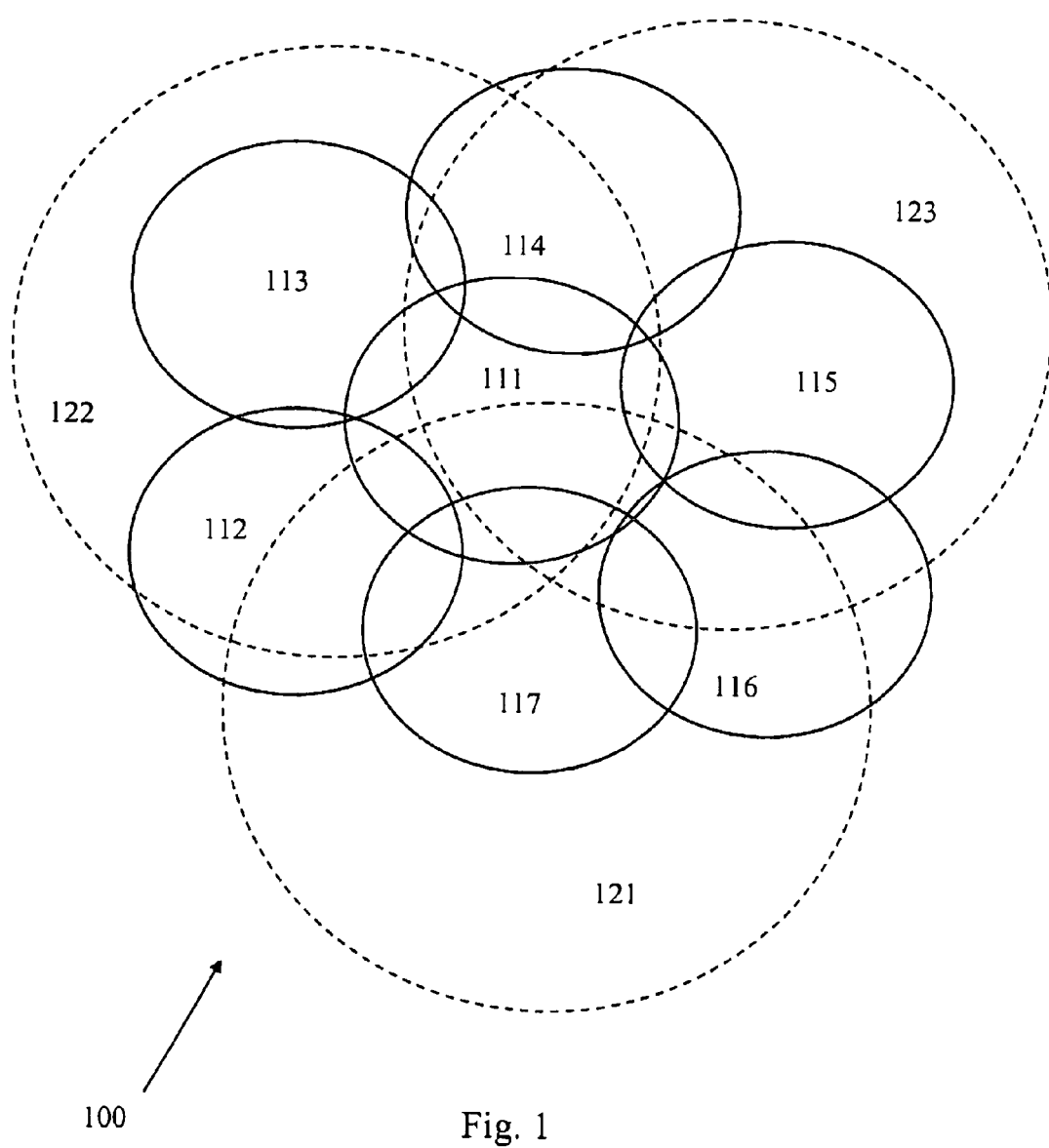
FIG. 1 is a view illustrating an area covered by a multitude of radio accesses

In FIG. 1 a view illustrating an exemplary area covered by multiple radio access technologies. Thus a number of cells of a first radio access technology generally denoted 110 and shown with cells having continuous boundary lines in FIG. 1 covers an area 100. The same area is also covered by a second radio access technology as shown by cells 120 having dashed boundary lines. For example the cells denoted 110, i.e. the cells having numbers 111-117 can be WCDMA cells and the cells denoted 120, i.e. the cells having numbers 121-123 can be GSM cells. A mobile station in the area 100 and supporting both radio access technologies can then connect to the network using any of the two radio access technologies.

Figure 2:
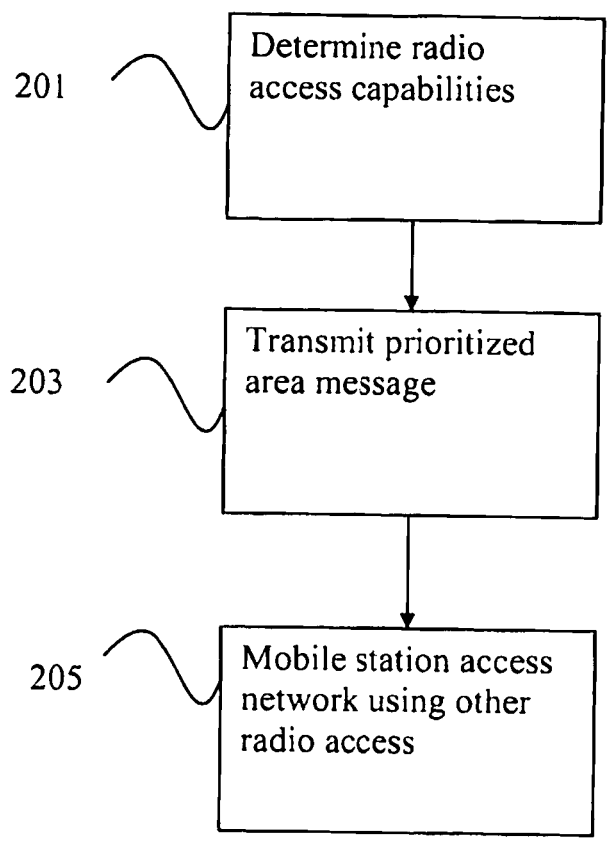
FIG. 2 is a flowchart illustrating the transmission of a message barring access from one access for mobile stations not having a high priority status.

In FIG. 2, a flowchart illustrating the transmission of a message barring access from one access for mobile stations not having a prioritized status is shown. Thus, in one embodiment when a mobile station attaches to the network, the radio access capabilities of the mobile station is determined, step 201. By defining a mechanism for steering the camping of a mobile station in idle mode towards one determined access barring of individual mobile stations can be obtained. Hence, in case of a geographical area being declared as a prioritized area a message is transmitted from the system instructing each mobile station in that area not to access the radio system using a particular radio access, step 203. This is signaled explicitly in a message from the network to the individual mobile station. In response to such a message the mobile station begins to access the network using another radio access technology that is open for ordinary mobile stations, step 205. The message transmitted from the network to the mobile station in step 203 may also contain a subset of currently available accesses offered by one operator in one geographical area that the mobile station can camp on.

Other methods that may be employed include using the cell-reselection parameters to steer all mobiles or groups of mobiles towards a certain access. Yet another method is to use broadcast information to explicitly order groups of mobiles towards a certain access.

In order to enforce correct behavior by the mobile stations, the system can collect statistics for different mobile stations in the Operation and Maintenance (O&M) system. By knowing IMEI per mobile station it can be analyzed which mobile station models from which manufacturers behave correctly and according to the intentions of the system.

As an alternative to transmit the message as an individual message it is also possible to perform a multi-cast or broadcast message to a sub-set or all mobile stations camping in the emergency area, barring the mobile stations from one (or more) radio access technologies. However, information particular to a mobile station can then not be transmitted, such as a subset of currently available accesses offered by one operator in one geographical area that the individual mobile station can camp on.

Figure 3:
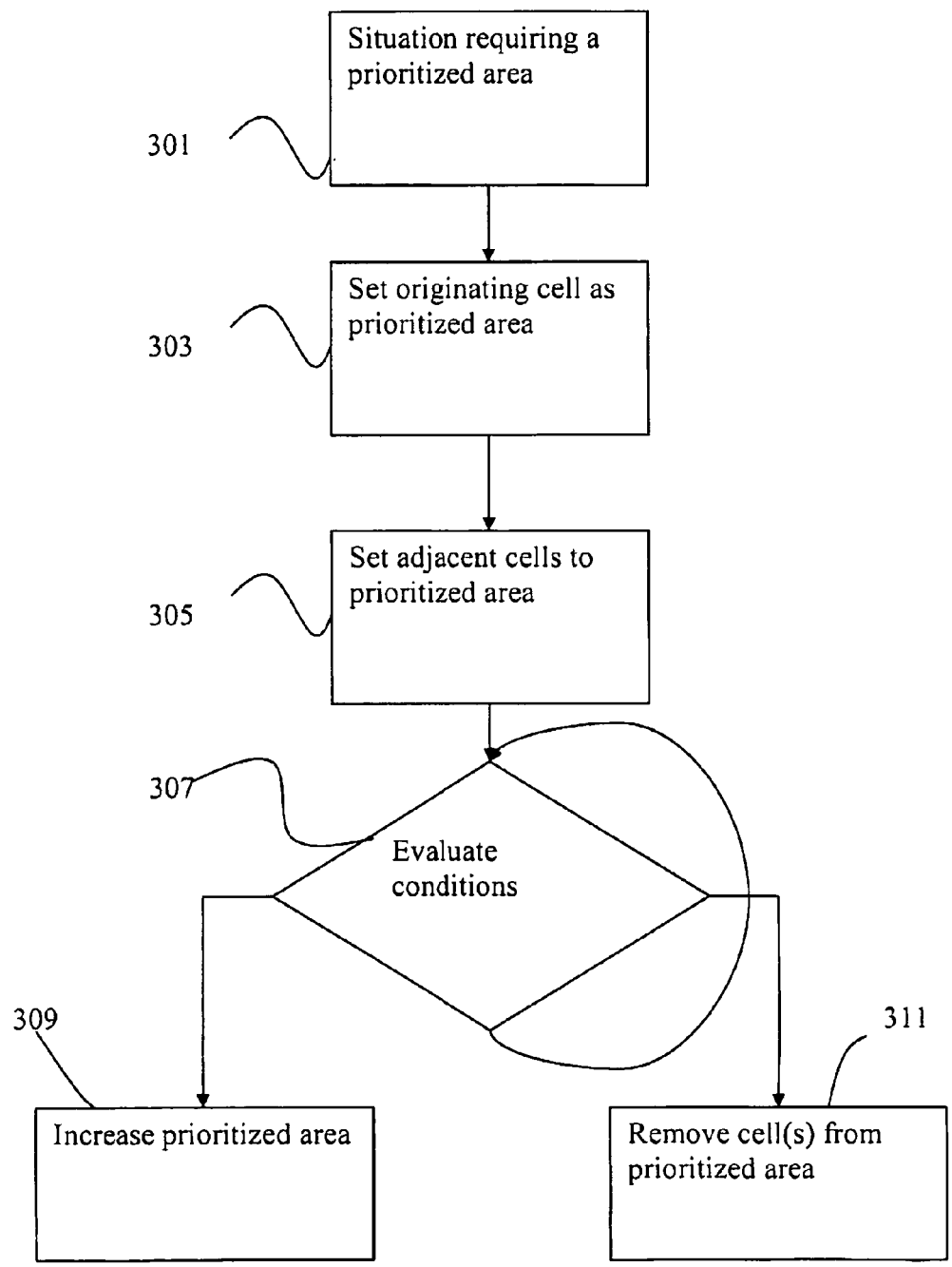
FIG. 3 is a flowchart illustrating steps performed when automatically shaping an area for exclusive use by high priority mobile stations.

In FIG. 3, a flowchart illustrating steps performed when automatically shaping an area for use by prioritized users is shown. Thus first in a step 301 it is determined that a situation requiring prioritized access for some users is at hand and that an area is to be set up for a particular radio access to meet this need. Next, in a step 303, the cell corresponding to the location where the prioritized access is required is set as a prioritized area. For example, the cell may correspond to the cell 121 in FIG. 1. In addition all cells adjacent to the cell initially set to a prioritized area are also set as a prioritized area. In the situation in FIG. 1 that would correspond to the cells 122-127, step 305. Next in a step 307, the area is re-evaluated. If in step 307 it is determined that an adjacent to the cell where the need for prioritized traffic originated has been used for radio access by a prioritized mobile station, the emergency area is extended to also include the neighboring cells of that cell, step 309. If in step 307 it is determined that a cell being part of the prioritized area has not been accessed for some predetermined period of time that cell is removed form the prioritized area and ordinary mobile stations may access that cell again, step 311. The re-evaluation in step 307 is then continued until either there are no more prioritized calls to any of the cells in the prioritized area for some predetermined period of time or it is manually reset to allow for ordinary radio access.

Using the method and the system as described herein, Multi-access environment controlled by one operator can efficiently be used in situations requiring prioritized resource allocation by providing guaranteed service on one (or more) pre-defined access to authorized mobile stations while still offering "ordinary" commercial service on the other access(es). Such temporary re-direction of the traffic can be applied in a geographical area shaped according to needs.

The invention claimed is:

1. A method of controlling radio access in a cellular radio network to which mobile stations can establish a radio connection, the cellular radio network comprising at least two radio access technologies, wherein when a situation requiring prioritizing radio resources occurs, the cellular radio network gives prioritized resources to at least some prioritized mobile stations connectable to the cellular radio network by:

the cellular radio network transmitting a message instructing a group of mobile stations not having prioritized status in a prioritization area covered by the cellular radio network to stop accessing the cellular radio network using a first radio access technology, and the mobile stations of the group which receive the message stopping access of the cellular radio network using the first radio access technology identified in the message and using a second radio access technology instead;

wherein the situation requiring prioritizing radio resources covers an emergency prioritization area of the cellular radio network, and wherein the method further comprises continuously updating size of the emergency prioritization area by:
increasing the emergency prioritization area to comprise all cells where radio traffic from prioritized mobile stations occurs and all cells neighboring to cells where radio traffic from prioritized mobile stations occurs; and
decreasing the emergency prioritization area to not comprise any cells where no radio traffic from prioritized mobile stations has occurred for a predetermined period of time.

2. The method according to claim 1, wherein the situation requiring prioritizing radio resources is triggered by a mobile station having a prioritized status.

3. The method according to claim 1, further comprising initially setting the emergency prioritization area to correspond to a cell where the situation requiring prioritizing radio resources has occurred and cells being neighbor cells to that cell.

4. The method according to claim 1, further comprising:
the cellular radio network instructing all mobile stations not having the prioritized status in the area covered by the cellular radio network to stop accessing the cellular radio network using the first radio access technology, and
all mobile stations not having the prioritized status stopping access of the cellular radio network using the first radio access technology identified in the message and using the second radio access technology instead.

5. The method according to claim 1, further comprising the cellular radio network sending individual messages to mobile stations of the group to instructing the mobile stations to stop accessing the cellular radio network using the first radio access technology.

6. The method according to claim 1, further comprising the cellular radio network sending a broadcast or multicast message to mobile stations of the group to instructing the mobile stations to stop accessing the cellular radio network using the first radio access technology.

7. The method according to claim 1, wherein when at least one mobile station of the group that receives the message is in idle mode, that mobile station is prevented from camping on the first radio access technology.

8. The method according to claim 1, wherein a controller of at least one mobile station of the group is configured such that when that mobile station in idle mode, the controller prevents that mobile station from camping on the first radio access technology.

9. A system configured to control radio access in a cellular radio network to which mobile stations can establish a radio connection, the cellular radio network comprising at least two radio access technologies, the system further comprising means for giving prioritized resources to some prioritized mobile stations connectable to the cellular radio network when a situation requiring prioritizing radio resources occurs, the system comprising:
a transmitter configured to transmit a message instructing a group of mobile stations not having prioritized status in a prioritization area covered by the cellular radio network to stop access of the cellular radio network using a first radio access technology,
processors in the mobile stations of the group configured to stop access of the cellular radio network using the a first radio access technology and use a second radio access technology instead,
wherein the situation requiring prioritizing radio resources covers an emergency prioritization area of the cellular radio network, and
wherein the system further comprises a prioritization area controller configured continuously update a size of the emergency prioritization area by:
increasing the emergency prioritization area to comprise all cells where radio traffic from prioritized mobile stations occurs and all cells neighboring to cells where radio traffic from prioritized mobile stations occurs; and
decreasing the emergency prioritization area to not comprise any cells where no radio traffic from prioritized mobile stations has occurred for a predetermined period of time.

10. The system according to claim 9, wherein the situation requiring prioritizing radio resources is triggered by a mobile station having a prioritized status.

11. The system according to claim 9, further comprising an access controller configured to only give prioritized resources in the emergency prioritization area part of the cellular radio network.

12. The system according to claim 11, wherein the prioritization area controller is configured to initially set the emergency prioritization area to correspond to a cell where the situation requiring prioritizing radio resources has occurred and cells being neighbor cells to that cell.

13. The system according to claim 9,
wherein the transmitter is configured to transmit the message instructing all mobile stations not having the prioritized status in an area covered by the cellular radio network to stop access of the cellular radio network using the first radio access technology, and
wherein the processors in the mobile stations not having the prioritized status are configured to stop access of the cellular radio network using the a first radio access technology and use the second radio access technology instead.

14. The system according to claim 9, wherein the transmitter is configured to send individual messages to mobile stations of the group to instructing the mobile stations to stop accessing the cellular radio network using the first radio access technology.

15. The system according to claim 9, wherein the transmitter is configured to send a broadcast or multicast message to mobile stations of the group to instructing the mobile stations to stop accessing the cellular radio network using the first radio access technology.

16. A method to prioritize communication resources to one or more prioritized mobile stations in a cellular radio network to which mobile stations can establish radio connections using at least first and second radio access technologies, the method comprising:
determining, by the cellular radio network, whether a priority situation has occurred, the priority situation being a situation in which radio resources of the cellular radio network are prioritized to be given to one or more prioritized mobile stations over one or more ordinary mobile stations; and
shaping, by the cellular radio network, a priority area based on the occurrence of the priority situation, the priority area comprising one or more cells of the cellular radio network, the priority area defining a subset of the cells of the cellular radio network in which the radio resources associated with the first radio access technology are prioritized to the prioritized mobile stations, wherein the step of shaping the priority area comprises:

setting the priority area to include an initial cell, the initial cell being a cell corresponding to where the priority situation occurred, and include all cells adjacent to the initial cell; and continually updating the priority area until there are no cells in the priority area, and wherein the step of updating the priority area comprises:

for each cell in the priority area, adding cells adjacent to that cell into the priority area when it is determined that a prioritized mobile station has used that cell for radio access; and for each cell in the priority area, removing that cell from the priority area when it is determined that no prioritized mobile station has used that cell for radio access for a predetermined period of time.

17. The method of claim 16, further comprising:

transmitting, from the cellular radio network, a message to a non-prioritized mobile station when the priority situation has occurred, the message instructing the non-prioritized mobile station not to use the first radio access technology to access the cellular radio network.

18. The method of claim 17, wherein the non-prioritized mobile station is in idle mode.

19. The method of claim 18, wherein the message notifies the non-prioritized mobile station of one or more radio access technologies other than the first radio access technology that the non-prioritized mobile station can camp on.

20. The method of claim 17, wherein the message notifies the non-prioritized mobile station of one or more radio access technologies other than the first radio access technology that the non-prioritized mobile station can use to access the cellular radio network.

* * * * *